United States Patent
Sutter et al.

(10) Patent No.: US 12,465,455 B2
(45) Date of Patent: Nov. 11, 2025

(54) DENTAL LASER FOR THE TREATMENT OF SOFT TISSUE

(71) Applicant: DENTSPLY SIRONA inc., York, PA (US)

(72) Inventors: Ralf Sutter, Weinheim (DE); Bernd Oehme, Mainz (DE); Steffen Muller, Zwingenberg (DE)

(73) Assignee: Dentsply Sirona Inc., York, PA (US)

( * ) Notice: Subject to any disclaimer, the term of this patent is extended or adjusted under 35 U.S.C. 154(b) by 257 days.

(21) Appl. No.: 17/024,966

(22) Filed: Sep. 18, 2020

(65) Prior Publication Data

US 2021/0000567 A1 Jan. 7, 2021

Related U.S. Application Data

(63) Continuation of application No. 15/549,884, filed as application No. PCT/EP2016/054616 on Mar. 4, 2016, now abandoned.

(30) Foreign Application Priority Data

Mar. 4, 2015 (DE) .......................... 102015203881.5

(51) Int. Cl.
  *A61C 1/00* (2006.01)
  *A61B 18/00* (2006.01)
  (Continued)

(52) U.S. Cl.
  CPC ............ *A61C 1/0046* (2013.01); *A61B 18/20* (2013.01); *A61B 2018/00029* (2013.01);
  (Continued)

(58) Field of Classification Search
  CPC ..... A61C 1/0046; A61C 19/063; A61B 18/22; A61B 2018/20359; A61B 2018/00029;
  (Continued)

(56) References Cited

U.S. PATENT DOCUMENTS 5,199,870 A * 4/1993 Steiner ................. A61C 1/0046
                                                    433/29
5,825,958 A    10/1998 Gollihar
              (Continued)

FOREIGN PATENT DOCUMENTS

JP    2007068976 A    3/2007
WO    2005070317 A1   8/2005
              (Continued)

OTHER PUBLICATIONS

Chinese Office Action dated Oct. 9, 2019.
(Continued)

*Primary Examiner* — Thomas C Barrett
*Assistant Examiner* — Matthew P Saunders
(74) *Attorney, Agent, or Firm* — SCHWEGMAN LUNDBERG & WOESSNER, P.A.

(57) ABSTRACT

A dental laser comprises a hand piece having a grip region and a treatment tip with an outlet point, arranged at a distal end, for laser light, and further comprises a light source and light conduction means for providing laser light at the outlet point. The laser light has a wavelength of 445±20 nm, in particular, 445±10 nm and more particularly 445±5 nm, and an optical power output is provided at the outlet point in a power range of at least 2 W, advantageously at least 3 W and, in particular, 3.5 W. In another dental laser the laser light has a wavelength of 410±10 nm, and an optical power output is provided at the outlet point in a power range of no less than 1 W to no more than 2 W.

11 Claims, 1 Drawing Sheet

(51) Int. Cl.
*A61B 18/20* (2006.01)
*A61C 19/06* (2006.01)

(52) U.S. Cl.
CPC ............... *A61B 2018/00321* (2013.01); *A61B 2018/00601* (2013.01); *A61B 2018/202* (2013.01); *A61B 2018/20359* (2017.05); *A61B 2018/2075* (2013.01); *A61B 2218/003* (2013.01); *A61C 19/063* (2013.01)

(58) Field of Classification Search
CPC ........... A61B 2018/00321; A61B 2018/00601; A61B 2018/202; A61B 2018/2075; A61B 2018/003; A61B 2218/003; A61B 18/20–28; A61F 9/008–009
See application file for complete search history.

(56) References Cited

U.S. PATENT DOCUMENTS

| | | | |
|---|---|---|---|
| 6,824,540 B1* | 11/2004 | Lin ..................... | A61F 9/00802 606/4 |
| 7,621,745 B2* | 11/2009 | Bornstein ............ | A61C 19/063 433/29 |
| 2004/0248060 A1 | 12/2004 | Cozean | |
| 2006/0240381 A1* | 10/2006 | Rizoiu ................. | A61C 17/024 433/80 |
| 2010/0106146 A1 | 4/2010 | Boitor | |
| 2010/0167229 A1* | 7/2010 | Ernst .................... | A61C 1/0046 433/29 |
| 2012/0123399 A1* | 5/2012 | Belikov ................. | A61B 18/22 606/17 |
| 2014/0113243 A1* | 4/2014 | Boutoussov ....... | B23K 26/0096 433/29 |
| 2015/0073399 A1 | 3/2015 | Boitor | |
| 2018/0028276 A1 | 2/2018 | Sutter et al. | |

FOREIGN PATENT DOCUMENTS

| | | | | |
|---|---|---|---|---|
| WO | WO-2011082383 A2 * | 7/2011 | .......... | A61B 18/201 |
| WO | WO-2016139332 A1 | 9/2016 | | |

OTHER PUBLICATIONS

Chinese Search Report; 201680013275.6; Filed: Mar. 4, 2016.
Japanese Office Action dated Jan. 21, 2020.
"U.S. Appl. No. 15/549,884, Examiner Interview Summary mailed Aug. 2, 2019", 3 pgs.
"U.S. Appl. No. 15/549,884, Final Office Action mailed Dec. 11, 2018", 8 pgs.
"U.S. Appl. No. 15/549,884, Final Office Action mailed Dec. 11, 2019", 8 pgs.
"U.S. Appl. No. 15/549,884, Non Final Office Action mailed Mar. 19, 2020", 8 pgs.
"U.S. Appl. No. 15/549,884, Non Final Office Action mailed Apr. 16, 2019", 10 pgs.
"U.S. Appl. No. 15/549,884, Non Final Office Action mailed May 22, 2018", 11 pgs.
"U.S. Appl. No. 15/549,884, Preliminary Amendment filed Aug. 9, 2017", 4 pgs.
"U.S. Appl. No. 15/549,884, Response filed Mar. 5, 2020 to Final Office Action mailed Dec. 11, 2019", 5 pgs.
"U.S. Appl. No. 15/549,884, Response filed Mar. 22, 2019 to Final Office Action mailed Dec. 11, 2018", 8 pgs.
"U.S. Appl. No. 15/549,884, Response filed Aug. 14, 2019 to Non Final Office Action mailed Apr. 16, 2019", 7 pgs.
"U.S. Appl. No. 15/549,884, Response filed Sep. 24, 2018 to Non Final Office Action mailed May 22, 2018", 8 pgs.
"International Application Serial No. PCT/EP2016/054616, International Preliminary Report on Patentability mailed Jan. 27, 2017", 13 pgs.
"International Application Serial No. PCT/EP2016/054616, Written Opinion mailed Jun. 13, 2016", 7 pgs.

* cited by examiner

DENTAL LASER FOR THE TREATMENT OF SOFT TISSUE

CROSS REFERENCE TO RELATED APPLICATIONS

This Application is a continuation of U.S. application Ser. No. 15/549,884 which is a National Stage Entry of PCT/EP2016/054616 all of which are hereby incorporated by reference in their entirety.

FIELD

The invention relates to a dental laser that is designed for the treatment of soft tissue and that comprises a handpiece having an application tip for emitting the laser light. In dentistry the soft tissue, in particular, the gum is cut with a dental laser, which has more power than a dental laser for disinfecting periodontal pockets or root canals.

BACKGROUND

The prior art discloses the use of dental lasers that are designed to cut soft tissue and that use laser light in the infrared range. Typical wavelengths of such laser light are 810±15 nm, 940 nm or 975±15 nm. In this case the laser beams are introduced into an optical waveguide of the application tip; and the distal end of the optical waveguide is brought into contact with the soft tissue. In order to cut the soft tissue, power levels in a range of 2 to 6 W are used at the distal end of the application tip, so that the result is intense heating of the tissue not only in the actual operating area, but also in the adjacent tissue.

Furthermore, it is also known to use diode lasers for other dental applications. For example, WO 2009/003014 A2 discloses a plurality of dental lasers, for example, a diode laser, which is provided for the treatment of soft tissue with a large coagulation zone for better homeostasis and which has a wavelength in the range of 500 to 1,350 nm and a power output of 1 to 100 W. Another dental laser, which is known from WO 2009/003014 A2 and which is provided for the treatment of soft tissue with a minimum zone of effectiveness and precise tissue cutting, has wavelengths of 300 to 450 nm or 1,350 to 3,000 nm and a power output of 0.1 to 100 W. The published document WO 2009/003014 A2 discloses yet another dental laser, which has several wavelengths of 410 nm, 577 nm, 975 nm, 1,470 nm, 1,890 nm and 2,940 nm; and these wavelengths match different maxima of the blood absorption and the water absorption, with the water considered to be the main absorber in the soft tissue of the mouth. The laser beams exit the handpiece through a tip. Although it is known from other lasers for cutting hard dental tissue, such as Er:YAG, Er:YSGG, that liquid is supplied for cooling or for facilitating the process, cooling the preparation site with water is always ruled out, when the wavelength that is employed is especially well absorbed by water. Therefore, in the case of diode lasers, in which the wavelengths that are used have a high water absorption, no cooling is provided.

All of the dental diode lasers known to date are operated in the so-called "contact mode", which means that the application fiber is in direct contact with, i.e., touches, the tissue that is to be cut. In this case the cutting of the tissue is carried out mainly by means of the thermal effect of the application fiber. The high temperature, which is required at the application fiber for the cutting, is achieved, on the one hand, by providing a sufficient laser power output and, on the other hand, by conditioning the application fiber prior to treatment. The fiber can be conditioned, for example, by blackening the surface of the fiber, for example, by means of paper. For this purpose, the fiber and the paper are brought into direct contact; and the laser is activated. The now blackened surface of the application fiber absorbs more light from the laser source and; as a result, the fiber is heated up with a higher degree of intensity.

The cutting of the tissue is also facilitated by the absorption of the laser radiation, issuing from the application fiber, in the tissue. This absorption depends, among other things, on the wavelength of the laser light. Thus, it has been found that at a wavelength of 940 nm, there is better absorption of the laser radiation in the soft tissue than at 970 nm.

In principle, cutting in contact mode always entails that a large amount of heat will be introduced into the tissue. On the one hand, this heat input is necessary for cutting, but, on the other hand, may also lead to thermal degradation or at least high stress on the tissue itself and/or the surrounding structures; in this case bone structures are also meant. Nevertheless, no dental diode lasers are known that operate in the contactless mode.

SUMMARY

A dental laser of the invention comprises a handpiece having a grip region and a treatment tip with an outlet point, arranged at a distal end, for laser light and, furthermore, comprises a light conduction means, arranged in the handpiece, for providing laser light at the outlet point, with said laser light coming from a light source, arranged inside or outside the handpiece. The laser light has a wavelength of 445±20 nm, in particular, 445±10 nm and more particularly 445±5 nm, and the optical power output is provided at the outlet point in a power range of no less than 2 W to no more than 5 W, advantageously at least 3 W and, in particular, 3.5 W.

At optical power output levels in a range starting at 2 W and, in particular, at 3.5 W, there is the possibility of operating the laser in a contactless mode at good to very good cutting efficiency with significantly less thermal degradation, since the absorption of 445 nm directly in the tissue is better. At 445 nm the absorption in the tissue takes place in the hemoglobin by orders of magnitude more readily than in water. At other wavelengths, such as 808 nm, 810 nm, 940 nm, 970 nm, 980 nm, the absorption curves of water and hemoglobin are closer together by powers of ten.

The thermal degradation is minimized, in particular, by the fact that the heat input by the heated application fiber itself is absent and only contributes heat owing to the absorption of the laser radiation in the tissue in order to heat the tissue. Five watts are considered to be the upper limit to ensure a sufficient distance from a power output level that will damage the soft tissue.

Due to the fact that, when cutting, the heat input by the heated application fiber itself is absent and that the tissue to be cut has a very high water content, water that does not evaporate directly as in the case of other wavelengths, such as 808 nm, 810 nm, 940 nm, 970 nm, 980 nm, can leave the tissue during the cutting process. Since water absorbs light having a wavelength of 445 nm very sparingly, the water is not appreciably heated or vaporized by the laser radiation. As a result, the exiting tissue fluid itself also cools the preparation site.

Since the fiber does not make contact with the preparation site and the absorption of the laser light in water is very low, it is also possible to use external water cooling for the cutting site in such a way that just the treatment instrument alone causes evaporation, i.e., a decrease in the cooling capacity. In the case of external cooling the cooling medium, such as, for example, water, can be fed to the application fiber at the proximal end of the application fiber and from there can flow, for example, due to gravity, to the distal end of the application fiber. However, it is also possible to feed, starting from the handpiece, the smallest possible amounts in a pulsating manner in the direction of the distal end of the application fiber by means of pressure and, in so doing, to form fine droplets.

Thus, the soft tissue can be cut particularly well, efficiently and gently at a wavelength of 445 nm and an optical power output in the range starting from 2 W and, in particular, at 3.5 W.

The optical power output at the outlet point can be advantageously changeable to a different power range, with the different power range running from at least 1 W to less than 2 W. At low laser power levels ranging from 1 to 2 W, the dental laser can be used in contact mode.

Based on the absorption mechanisms described above, the result is a therapeutic window that lends itself to the use of a blue diode laser having a laser power output in the range of 1 to 3.5 W and even higher.

Another subject matter of the present invention is a dental laser, as described above, but in this case the laser light has a wavelength of 410±10 nm, and an optical power output is provided at the output point in a power range of no less than 1 W to no more than 2 W.

At this shorter wavelength the absorption behavior of the laser light in the soft tissue is once again noticeably improved, so that a smaller power output is sufficient. This feature may justify the possibly higher financial outlay associated with providing a light source for laser light of this wavelength.

Advantageously the light source may comprise at least one laser diode, preferably at least two, and, in particular, three.

This aspect makes it possible to provide a handpiece that is compact and permits easy handling.

The laser diodes can be located in a device that transmits the laser radiation to the handpiece by means of a light guide. However, it is also possible to integrate the laser diode, required to generate the light, or the necessary diodes directly into the handpiece.

Advantageously the light conduction means for providing laser light at the outlet point may have application fibers between 150 and 350 µm in diameter.

The advantage of the fiber between 150 and 350 µm is that at these diameters the power level is relatively high in relation to the exit surface. The small diameter also enables small cutting widths, especially if the fiber is guided over the tissue to be cut without making contact, since the divergence of the radiation, which is primarily a function of the material of the light guide, has to be taken into account.

Advantageously a coolant line can be arranged in the handpiece; and there may be an outlet opening, from which the coolant, directed to the preparation site, issues. In this case the amount of coolant ranges preferably from 0.1 to 10 ml/min. The result of this output of the cooling medium is that not only is the preparation site cooled, but the tissue is also wetted in a targeted way, features that are beneficial to the healing process. Too large a quantity of coolant attenuates the laser power at the coolant in spite of the very low absorption; at 0.1 ml/min. it is possible to ensure wetting.

Advantageously the coolant may have a disinfecting effect. This feature makes it possible not only to cool, but also to disinfect the preparation site.

In the present invention a dental laser is provided that can be used in the surgical treatment of the human or animal body, and, as a result, the side effects are reduced; and it can be assumed that the wound will heal much faster.

BRIEF DESCRIPTION OF THE DRAWINGS

The invention is explained in more detail in the drawings. In the drawings.

DETAILED DESCRIPTION

Exemplary Embodiment

Figure 1:
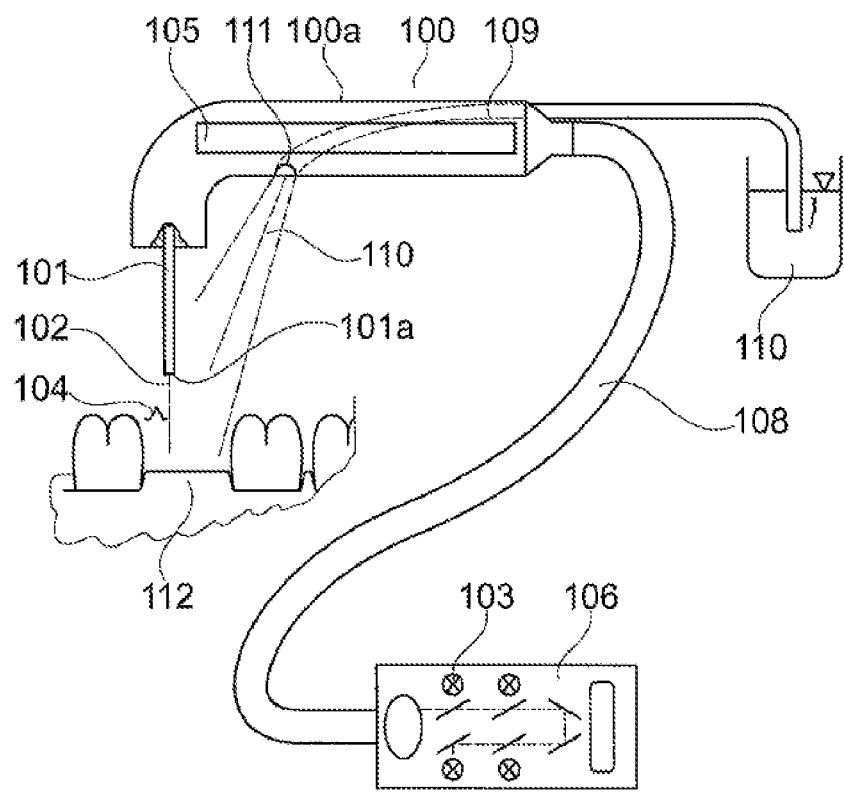
FIG. 1 shows a schematic diagram of an inventive dental laser with an outlet point of the laser light from an application fiber.

FIG. 1 shows a dental laser with a handpiece 100 for the treatment of the human or animal body by means of laser beams 102. The laser beams 102 are generated in a laser module 106 by means of one or more laser diodes 103 with laser light of a wavelength 104 of 445±20 nm, preferably 445±10 nm, in particular, preferably 445±5 nm and are transmitted to the handpiece 100 by means of a light guide 108. The handpiece 100 has a housing 101 with a grip region 100a and a treatment tip 101 with an outlet point 101a, disposed at a distal end, for the laser light 102.

In the housing there is a light conduction means 105 for providing laser light at the outlet point 103, with the laser light coming from a light source, arranged inside or outside the handpiece 100, in the form of one or more laser diodes 103.

According to a preferred embodiment, three laser diodes, which are arranged in a laser module 106 separate from the handpiece 100 and which have a wavelength of 445 nm±20 nm, each having an optical power output of 1.6 W, are coupled to a laser beam 102 and are guided in the handpiece 100 by means of a light guide 108. The net result is a nominal power output of 3×1.6 W=4.8 W. Owing to the losses inside the laser module 106, caused by the optical components, owing to the coupling losses between the laser module 106 and the transfer fiber 108 to the handpiece 100 as well as owing to the losses in the handpiece 100 itself and during the coupling of the treatment tip 101, the power output that remains available at the distal end of the treatment tip is only about 3.5 W.

Figure 2:
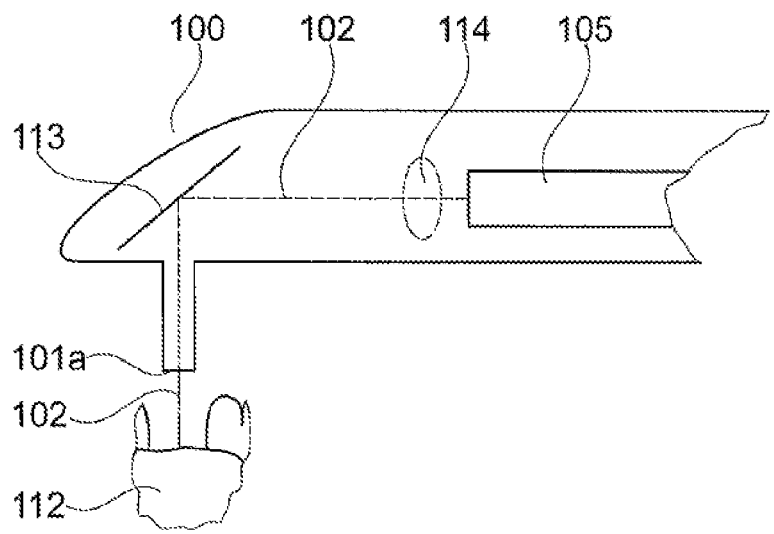
FIG. 2 shows the dental laser from FIG. 1 with an outlet point of the laser light in a free jet.

In the treatment tip there may be an application fiber, at the distal end of which the laser light exits. However, it is also possible to direct the laser light to the treatment site in a free jet without a light guide. This arrangement is shown in FIG. 2. Starting from the light conduction means 105, a free laser beam 102 travels inside the handpiece 100 and issues from the handpiece at an outlet point 101a after a beam deflection by means of an optical component 113, like a mirror. Downstream of the light conduction means 105 means 114 may be provided, for example, optical means, such as lenses, which lend themselves to reducing the divergence of the laser radiation. In this way it is possible to extend the necessary working distance from the outlet point 101a to the preparation site 112, so that the distance, at which it is easy to work, extends over an enlarged area.

If the nominal power output of each of the diodes is 4.8 W, then the electric power output of the laser module is 17.2 W, i.e., 3×4.8 V×1.2 A.

Moreover, it is possible to cool the preparation site with an externally supplied cooling fluid. Water lends itself well to this task, but a physiological saline solution would be just as suitable and would have the advantage that it is readily available sterile.

The handpiece 100 may have a coolant line 109, through which a coolant 110 may be fed to an outlet opening 111, where the coolant 110 exits in such a way that it is directed to the preparation site 112.

The amount of coolant can be preferably between 0.1 and 10 ml/min. The cooling can be carried out preferably by means of water or a physiological saline solution.

With the use of the new wavelength, 445 nm, blue light, and the increased optical laser power output it is possible to cut in the contactless mode due to the absorption behavior of the soft tissue.

The blue light is not primarily absorbed by the water, but rather the hemoglobin, which is also in the tissue. At a wavelength of 445 nm, the absorption coefficient for hemoglobin is 105 times higher than the absorption coefficient for water. This absorption behavior makes it possible to cut, even without the thermal transmission of energy from the fiber to the tissue. The tissue is processed by just the energy alone that is generated in the tissue by the radiation.

The laser light, which is used for cutting, may also be provided due to the fact that the laser diode sits directly in the handpiece and that the application fiber is coupled to the laser diode. The invention is independent of the generation and transmission of the laser light.

In the case of a laser diode having, for example, a power output of 3.5 W, this laser diode may be used directly in the handpiece. If the laser diode is placed in the handpiece, the transmission losses are very low, since there is only one interface to the application fiber.

What is claimed is:

1. A method of cutting dental tissue comprising:
   providing a handpiece including a grip region, a treatment tip arranged at a distal end of the handpiece, and a light conduction device disposed in the handpiece and configured to provide laser light to cut the dental tissue;
   configuring the handpiece to operate in a first mode of operation wherein the laser light is configured to have a wavelength and optical power output combination of 445±20 nm and 2 W to 5 W;
   directing the laser light in a light path from a light source to the dental tissue, the directing starts from the light source, through an outlet point of the treatment tip and onto the dental tissue to non-contactly cut the dental tissue, wherein the dental tissue is processed substantially by energy generated in the dental tissue by absorption of the laser energy and not thermal transmission of energy from the treatment tip to the dental tissue; and
   configuring the handpiece to operate in a second mode of operation wherein the laser light is configured to have a wavelength and optical power output combination of 410±10 nm and 1 W to 2 W, wherein the handpiece is guided over the dental tissue in a contact manner to cut said dental tissue using the treatment tip.

2. The method of claim 1, further comprising directing the laser light to the dental tissue in a free jet without a light guide.

3. The method of claim 1, further comprising using an optical device to reduce a divergence of the laser light inside the handpiece to extend a working distance of the laser light from the outlet point to the dental tissue.

4. The method of claim 1, further comprising arranging a coolant line on or in the handpiece such that there is an outlet opening, from which a coolant exits to cool the dental tissue.

5. The method of claim 4, wherein the coolant output rate ranges from 0.1 to 10 ml/min.

6. The method according to claim 4, wherein responsive to guiding the laser light over the dental tissue in a non-contact manner, said laser light is substantially absorbed by hemoglobin in the dental tissue rather than by the coolant from a coolant line in order to cut the dental tissue.

7. The method according to claim 4, wherein the coolant has a disinfecting effect.

8. The method according to claim 1, wherein the treatment tip has an application fiber diameter from 150 μm to 350 μm.

9. The method of claim 1, further comprising:
   configuring the light source to include at least two laser diodes.

10. A method of cutting dental tissue comprising:
    providing a handpiece having a grip region, a treatment tip arranged at a distal end of the handpiece, and a light conduction device disposed in the handpiece and configured to provide laser light to cut the dental tissue;
    arranging at least one laser diode outside the handpiece to provide the laser light;
    configuring the handpiece to operate in a first mode of operation wherein the laser light is configured to have a wavelength and optical power output combination of 445±20 nm and 2 W to 5 W;
    directing the laser light in a light path from a light source to the dental tissue, the directing starts from the light source, through an outlet point of the treatment tip and onto the dental tissue to non-contactly cut the dental tissue, wherein the dental tissue is processed substantially by energy generated in the dental tissue by absorption of the laser energy and not thermal transmission of energy from the treatment tip to the dental tissue; and
    configuring the handpiece to operate in a second mode of operation wherein the laser light is configured to have a wavelength and optical power output combination of 410±10 nm and 1 W to 2 W, wherein the handpiece is guided over the dental tissue in a contact manner to cut said dental tissue using the treatment tip.

11. A method of cutting dental tissue comprising:
    providing a handpiece having a grip region, a treatment tip arranged at a distal end of the handpiece, and a light conduction device disposed in the handpiece and configured to provide laser light to cut the dental tissue;
    arranging a coolant line on or in the handpiece such that there is an outlet opening, from which a coolant exits to cool the dental tissue;
    configuring an application fiber diameter of a treatment tip to be from 150 μm to 350 μm;
    configuring the handpiece to operate in a first mode of operation wherein the laser light is configured to have a wavelength and optical power output combination of 445±20 nm and 2 W to 5 W;
    directing the laser light in a light path from a light source to the dental tissue, the directing starts from the light source, through an outlet point of the treatment tip and onto the dental tissue to non-contactly cut the dental tissue, wherein the dental tissue is processed substantially by energy generated in the dental tissue by absorption of the laser energy and not thermal transmission of energy from the treatment tip to the dental tissue;

configuring the handpiece to operate in a second mode of operation wherein the laser light is configured to have a wavelength and optical power output combination of 410±10 nm and 1 W to 2 W, wherein the handpiece is guided over the dental tissue in a contact manner to cut said dental tissue using the treatment tip; and configuring the coolant line to cool the dental tissue using at a coolant output rate ranges from 0.1 to 10 ml/min.

\* \* \* \* \*

UNITED STATES PATENT AND TRADEMARK OFFICE
CERTIFICATE OF CORRECTION

PATENT NO. : 12,465,455 B2
APPLICATION NO. : 17/024966
DATED : November 11, 2025
INVENTOR(S) : Sutter et al.

Page 1 of 1

It is certified that error appears in the above-identified patent and that said Letters Patent is hereby corrected as shown below:

In the Claims

In Column 6, Line 6, in Claim 5, delete "the" and insert --a-- therefor

Signed and Sealed this
Twenty-seventh Day of January, 2026

John A. Squires
*Director of the United States Patent and Trademark Office*